(12) United States Patent
Peterson et al.

(10) Patent No.: US 11,061,808 B2
(45) Date of Patent: Jul. 13, 2021

(54) TROUBLESHOOTING TEST FAILURES THAT OCCURRED DURING A TESTING PHASE OF A CONTINUOUS INTEGRATION PIPELINE

(71) Applicant: Red Hat, Inc., Raleigh, NC (US)

(72) Inventors: Michel Peterson, Ramat Gan (IL); Michael Kolesnik, Netanya (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/591,815

(22) Filed: Oct. 3, 2019

(65) Prior Publication Data
US 2021/0103512 A1    Apr. 8, 2021

(51) Int. Cl.
*G06F 9/44* (2018.01)
*G06F 11/36* (2006.01)

(52) U.S. Cl.
CPC ........ *G06F 11/3636* (2013.01); *G06F 11/368* (2013.01); *G06F 11/3612* (2013.01); *G06F 11/3688* (2013.01); *G06F 11/3692* (2013.01)

(58) Field of Classification Search
CPC ............. G06F 11/3612; G06F 11/3636; G06F 11/368; G06F 11/3688; G06F 11/3692
USPC .................................................. 717/124–133
See application file for complete search history.

(56) References Cited

U.S. PATENT DOCUMENTS

| | | | | |
|---|---|---|---|---|
| 8,935,654 | B2 * | 1/2015 | Sengupta | G06F 11/3684 717/101 |
| 9,021,458 | B1 * | 4/2015 | Jacob | G06F 8/60 717/168 |
| 9,113,130 | B2 * | 8/2015 | Sandrew | H04N 13/189 |
| 9,880,837 | B2 * | 1/2018 | Khazanchi | G06F 9/45558 |
| 10,025,692 | B2 | 7/2018 | Wood et al. | |
| 10,198,344 | B2 | 2/2019 | Vyas et al. | |

(Continued)

FOREIGN PATENT DOCUMENTS

| | | |
|---|---|---|
| CN | 103077111 B | 2/2016 |
| CN | 109189674 A | 1/2019 |

OTHER PUBLICATIONS

Jenkins, "Recording tests and artifacts", 2018, retrieved from https://jenkins.io/doc/pipeline/tour/tests-and-artifacts/, 2 pages. (Year: 2018).*

(Continued)

*Primary Examiner* — Ted T. Vo
(74) *Attorney, Agent, or Firm* — Kilpatrick Townsend & Stockton LLP (57) ABSTRACT

Some examples of the present disclosure relate to troubleshooting test failures that occurred during a testing phase of a continuous integration pipeline. In one particular example, a system can detect that an artifact failed the testing phase. The testing phase can involve each worker node in a plurality of worker nodes executing a respective group of tests on the artifact. Based on detecting that the artifact failed the testing phase, the system can determine a particular worker node that executed a test that failed during the testing phase. The system can then determine the respective group of tests that was executed by the particular worker node during the testing phase. The system can re-execute the respective group of tests on the artifact in accordance with troubleshooting rules to determine a reason that the test failed during the testing phase.

20 Claims, 4 Drawing Sheets

(56) References Cited

U.S. PATENT DOCUMENTS 10,303,586 B1     5/2019   Falko
10,402,302 B1     9/2019   Ramraz et al.

OTHER PUBLICATIONS

Jenkins, "Pipeline Run Details View", 2018, retrieved from https://www.jenkins.io/doc/book/blueocean/pipeline-run-details/, 4 pages. (Year: 2018).*

Jenkins, "Pipeline Examples", 2018, retrieved from https://www.jenkins.io/doc/pipeline/examples/9 pages. (Year: 2018).*

Walter, T., "How to Reconstruct Failed Test Cases in CI Systems," Ranorex GmbH, Aug. 17, 2017, https://www.ranorex.com/blog/how-to-reconstruct-failed-test-cases-in-ci-systems/.

"Recheck Failed CI jobs in Neutron," Aug. 30, 2019, https://docs.openstack.org/neutron/pike/contributor/policies/gerrit-recheck.html.

* cited by examiner

TROUBLESHOOTING TEST FAILURES THAT OCCURRED DURING A TESTING PHASE OF A CONTINUOUS INTEGRATION PIPELINE

TECHNICAL FIELD

The present disclosure relates generally to continuous integration during software development. More specifically, but not by way of limitation, this disclosure relates to troubleshooting test failures that occurred during a testing phase of a continuous integration pipeline.

BACKGROUND

Continuous integration is the process of merging developers' working copies of source code into a shared mainline code-base at frequent intervals, such as multiple times a day. Continuous integration is implemented using a continuous integration tool, such as Jenkins, Buildbot, and Travis CI. Developers can submit source code at periodic intervals to the continuous integration tool, which can implement a continuous integration pipeline that attempts to produce a build from the source code. A build is executable code that has been successfully created and tested for a piece of software, such as a software application. Generally, the continuous integration pipeline includes multiple phases that are executed in a sequential order. The continuous integration pipeline can begin with a compilation phase in which the source code is compiled into artifacts. Artifacts are executable code that has been compiled from source code for testing. The continuous integration pipeline can then perform a testing phase in which various types of tests (e.g., integration tests, acceptance tests, and unit tests) are executed on the artifacts. The testing phase can enable the developers to rapidly detect defects in the source code, so that they can be corrected as soon as possible.

DETAILED DESCRIPTION

A testing phase of a continuous integration pipeline can fail for numerous reasons, some of which may be unrelated to a defect in the underlying source code being tested. For example, a test executed during the testing phase may require certain computing resources (e.g., a database) to be "set up" prior to the test or "torn down" upon completion of the test. Setting up a computing resource may involve creating or configuring the computing resource in a certain way, and tearing down a computing resource may involve deleting or freeing up the computing resource. But if the computing resources are improperly set up, the test may fail. And if the computing resources are improperly torn down, a subsequent test that relies on the same computing resources may fail. Other conflicts leading to failures can also arise between tests. Tests that fail for reasons other than a defect in the underlying source code being tested can be referred to as "false failures." False failures are challenging to detect and often require developers to engage a manual, tedious, time consuming, and complex process to identify and resolve them. These challenges are further exacerbated for false failures arising from the order in which the tests were executed during the testing phase, since the tests are generally executed in a random order that makes it challenging to recreate the circumstances that led to the false failures.

Some examples of the present disclosure can overcome one or more of the abovementioned problems by detecting that an artifact failed a testing phase of a continuous integration pipeline, re-executing a group of tests performed during the testing phase on the artifact in accordance with troubleshooting rules to determine a reason that a test failed, and notifying a developer of the reason that the test failed. This automated process can enable a developer to determine, rapidly, whether the test failure is a false failure or a true failure (i.e., a failure resulting from a defect in the underlying source code being tested). It can also provide the developer with a deeper understanding of the reason for the test failure, so that the developer can take any necessary corrective action.

The troubleshooting rules can effectuate any number and combination of troubleshooting techniques. Generally, the troubleshooting rules include a predefined set of instructions for determining how or why a test failed. In one example, the troubleshooting rules can involve executing the group of tests in multiple different orders (e.g., in every possible order) to determine if a particular testing sequence is responsible for the test failure. If so, it may indicate that the test failure is a false failure arising from a problem with the tests. In another example, the troubleshooting rules may involve executing the group of tests on a multiple commits associated with the artifact to determine if a specific commit is responsible for the test failure. A "commit" is source code submitted by a developer to the continuous integration tool for merging into the shared mainline code-base. If a specific commit is causing the test failure, it may indicate that the test failure is a true failure arising from a defect in the committed source code.

Once the continuous integration tool has determined the reason that the test failed, the continuous integration tool may automatically take corrective action. For example, the continuous integration tool can determine that the test failed because of a problematic testing sequence. So, the continuous integration tool can execute a modified version of the testing phase that executes the group of tests in an order that is different from the problematic testing sequence to avoid another failure of the test. As another example, the continuous integration tool can determine that the failed test is skippable. A test may be skippable if it is unimportant or unnecessary. Based on determining that the failed test is skippable, the continuous integration tool can execute a modified version of the testing phase that skips the test to avoid another failure of the test.

In some examples, at least part of the automated process discussed above can be implemented by a plugin for the continuous integration tool. The plugin can be downloaded separately from the continuous integration tool and then integrated into the continuous integration tool, thereby enabling the continuous integration tool to execute at least part of the automated process. In one particular example, the plugin can include program code for executing the entire automated process discussed above. In another example, the plugin can simply define the troubleshooting rules, while the rest of the automated process is preprogrammed into the continuous integration tool. Either way, the plugin can be downloaded from a repository of plugins (e.g., interchangeable plugins) that have different sets of troubleshooting rules and/or that are compatible with different types of continuous integration tools. This can enable a community of developers to create custom plugins suitable for their needs.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
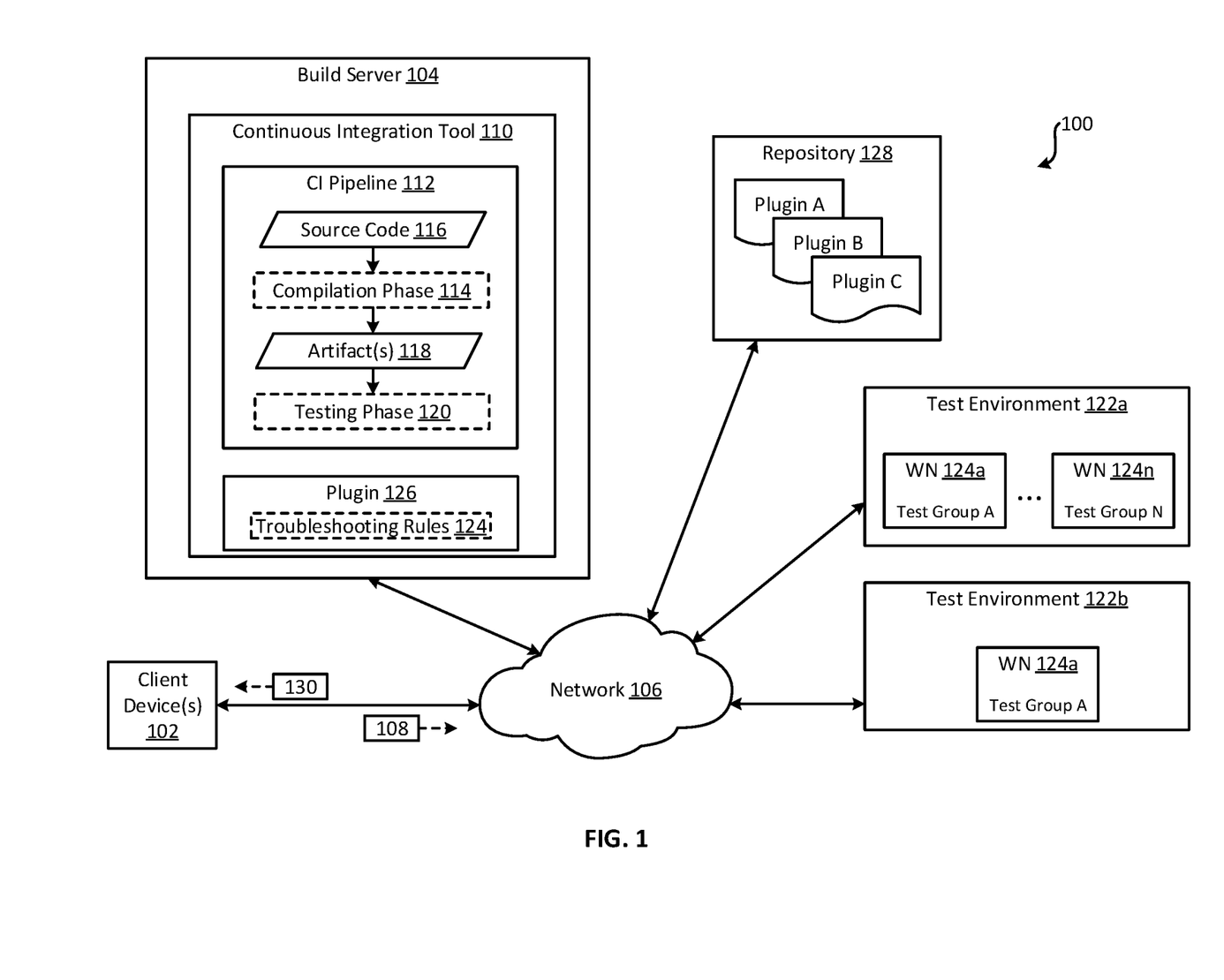
FIG. 1 is a block diagram of an example of a system for troubleshooting test failures that occurred during a testing phase of a continuous integration pipeline according to some aspects of the present disclosure.

FIG. 1 is a block diagram of an example of a system 100 for troubleshooting test failures that occurred during a testing phase 120 of a continuous integration pipeline 112 according to some aspects. The system 100 includes one or more client devices 102 communicatively coupled to a build server 104 via a network 106, such as a local area network (LAN), wide area network (WAN), the Internet, or any combination of these. The client devices 102 can include computing devices (e.g., desktop computers, laptop computers, mobile devices, or servers) on which one or more developers can edit working copies of source code for software and periodically submit the working copies to the build server 104 as commits 108.

The build server 104 can be a computing device such as a server or desktop computer. The build server 104 can receive the committed source code and provide it to a continuous integration tool 110, which implements a continuous integration pipeline 112 that attempts to produce a build of the software using the source code.

The continuous integration pipeline 112 includes multiple phases for attempting to produce the build. The phases include a compilation phase 114 in which the source code 116 for the software is compiled into one or more artifacts 118. The phases also include a testing phase 120 in which one or more types of tests are executed on the artifacts 118. Examples of test types include integration tests, acceptance tests, and unit tests.

The continuous integration tool 110 can execute the testing phase 120 using a test environment 122a. The test environment 122a may be a virtual computing environment, a physical computing environment, or a combination thereof. In examples in which the test environment 122a includes a virtual computing environment, the virtual computing environment can be persistent or ephemeral (e.g., created just prior to testing and torn down upon completion of testing).

The test environment 122a includes one or more worker nodes 124a-n, which are designated as "WN" in FIG. 1. A worker node can be a virtual node or a physical node designated for executing tests. Examples of a virtual node can include a processing thread, virtual machine, or container (i.e., an isolated set of computing resources allocated for a particular purpose). Examples of a physical node can include a server or a desktop computer.

Each time the testing phase 120 is executed, each of the worker nodes 124a-n can be assigned a respective group of tests to execute on the artifacts 118. For example, worker node 124a can be assigned Test Group A, where Test Group A may be a randomly chosen selection and order of tests.

Likewise, worker node 124n can be assigned Test Group N, where Test Group N may be a randomly chosen selection and order of tests. This randomness generally causes the arrangement of tests (e.g., the selection and/or order of the tests) executed by each worker node to change every time the testing phase 120 is repeated, making it challenging to detect and recreate false failures arising from a particular arrangement of tests.

To solve one or more of the abovementioned problems, some examples of the present disclosure enable the system 100 to automatically execute a troubleshooting process to detect and assess a test failure. One example of the troubleshooting process is shown in FIG. 2, which is discussed below in conjunction with the features of FIG. 1.

Figure 2:
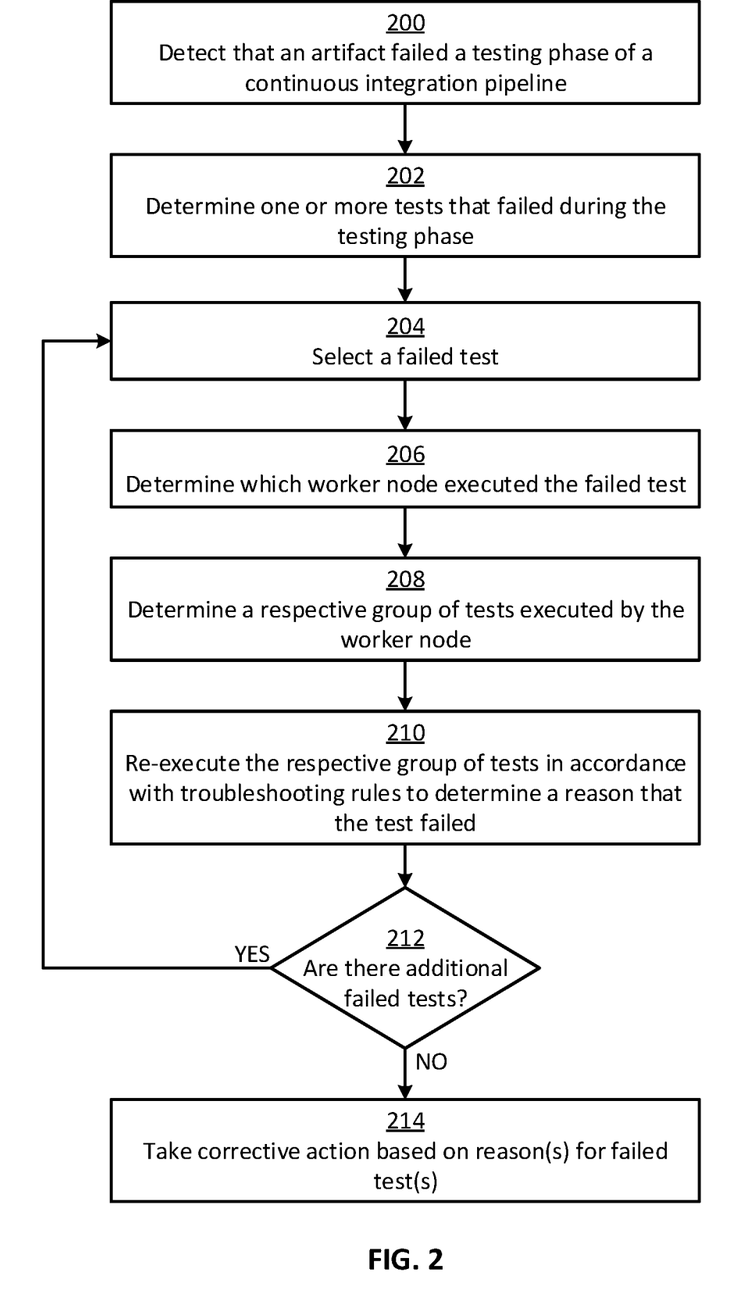
FIG. 2 is a flow chart of an example of a troubleshooting process according to some aspects of the present disclosure.

Now referring to FIG. 2, the troubleshooting process begins at block 200 where the system 100 detects that an artifact 118 failed a testing phase 120 of a continuous integration pipeline 112. For example, the system 100 can monitor the tests being performed in the test environment 122a for failures.

In block 202, the system 100 determines one or more tests that failed during the testing phase 120. This may involve the system 100 accessing a list of failed tests associated with the testing phase 120, where the list of failed tests may have been generated by the continuous integration tool 110 or another component of the system 100. For example, the continuous integration tool 110 can generate the list of failed tests for a developer upon completion of the testing phase 120, so that the developer knows which tests failed during the testing phase 120 and can take appropriate corrective action with respect to the underlying source code.

Since it is typically assumed that test failures are true failures rather than false failures, the list of failed tests generally lacks any contextual information describing the circumstances surrounding a failed test, such as the particular worker node that executed the failed test, the hardware and software characteristics of that worker node, and/or the other tests that were executed by that same worker node. Without this contextual information, it can be challenging for developers to detect and troubleshoot false failures, particularly those arising from the context in which a test was executed. Some examples of the present disclosure can implement blocks 204-208 below to aid in determining this contextual information.

In block 204, the system 100 selects a failed test for further analysis. For example, the system 100 can select one of the failed tests from the list of failed tests.

In block 206, the system 100 determines which worker node executed the failed test. For example, as discussed above, the list of failed tests may not include contextual information associated with the failed test, such as the specific the worker node that executed the failed test. So, the system 100 can compare the failed test to the respective groups of tests executed by the worker nodes 124a-n to determine which worker node executed the failed test. In one such example, the system 100 can access a log file for a worker node, where the log file includes identifiers (e.g., names) of the tests that were executed by the worker node during the testing phase 120. The system 100 can then compare (i) an identifier of the failed test to (ii) the identifiers of the tests executed by the worker node during the testing phase 120, to determine if there is a match between the two. If there is not a match, the system 100 can repeat this process for another worker node. The system 100 can keep iterating this process until a match is found, at which point the system 100 can attribute the failed test to the proper worker node.

In block 208, the system 100 determines a respective group of tests that was executed by the worker node. For example, each worker node may have a log file that indicates the respective group of tests executed by that worker node. So, the system 100 can access the log file associated with the worker node to determine the respective group of tests that was executed by the worker node, including an order in which the tests in the group were executed.

At this stage, the system 100 has at least some contextual information related to the failed test—e.g., the particular worker node that executed the failed test during the testing phase 120, the respective group of tests executed by that worker node during the testing phase 120, and/or the order in which those tests were executed during the testing phase 120. The system 100 can additionally or alternatively determine other contextual information related to the failed test, such as a hardware characteristic and a software characteristic of the particular worker node that executed the failed test during the testing phase 120.

In block 210, the system 100 re-executes the respective group of tests in accordance with troubleshooting rules 124 to determine a reason that the test failed. Re-executing the respective group of tests, rather than just the failed test by itself, can help to recreate the context that led to the original test failure, which may be important for determining the reason for the test failure.

In some examples, the system 100 can re-execute the respective group of tests using the same test environment 122a that was previously used during the testing phase 120. Alternatively, the system 100 can re-execute the respective group of tests using a new test environment 122b, for example, if it is suspected that a hardware or software characteristic of the test environment 122a is at least partially responsible for the test failure. Likewise, the system 100 can re-execute the respective group of tests using the same worker node 124a that previously executed the respective group of tests during the testing phase 120. Alternatively, the system 100 can re-execute the respective group of tests using a different worker node 124n, for example, if it is suspected that a hardware or software characteristic of the worker node 124a is at least partially responsible for the test failure.

The troubleshooting rules 124 used to re-execute the respective group of tests can effectuate any number and combination of troubleshooting techniques. For example, the troubleshooting rules 124 can involve executing the respective group of tests in every possible order to determine if a particular testing sequence is responsible for the failed test. If so, it may indicate that the failed test is a false failure arising from a problem with the respective group of tests. Additionally or alternatively, the troubleshooting rules 124 may involve executing the respective group of tests on multiple commits 108 to determine if a specific commit is responsible for the failed test. For example, the troubleshooting rules 124 may involve executing the respective group of tests on some or all of the commits that occurred between two dates (dates and times), such as between Sep. 1, 2019 at 1:07 PM EST and Sep. 4, 2019 at 3:27 PM EST, in order to determine if a specific commit is causing the test failure. If a specific commit is causing the test failure, it may indicate that the test failure is a true failure arising from a defect in the specific commit. Additionally or alternatively, the troubleshooting rules 124 can involve iteratively adjusting a software characteristic (e.g., a setting) of the worker node and re-executing the respective group of tests with each iteration, to determine a particular software configuration that is responsible for the failed test.

In some examples, the troubleshooting rules 124 are preprogrammed into a system component, such as the continuous integration tool 110. In other examples, the troubleshooting rules 124 are defined by a plugin 126 configured to integrate with the system component. A plugin is a software module that is distinct from, and configured to expand the functionality of, a system component with which the plugin 126 is designed to integrate. The plugin 126 can be downloaded from a repository 128 of plugins having different sets of troubleshooting rules and/or compatibilities.

Once a reason for the test failure has been determined, in some examples the system 100 can transmit a notification 130 to one or more of the client devices 102 to notify a developer of the reason for the test failure. For example, the notification 130 may indicate that the test failure is a false failure or a true failure. The notification 130 may provide additional information about the test failure, such as an identifier of the failed test and at least one factor (e.g., the testing sequence) contributing to the test failure.

In block 212, the system 100 determines if there are additional failed tests to analyze. For example, the system 100 can determine if it has reached the end of the list of failed tests. If so, it may indicate that there are no more failed tests to analyze. If not, there may still be remaining failed tests to analyze.

If there are additional failed tests to analyze, the process can return to block 204, where another failed test can be selected and the process can iterate. Otherwise, the process can continue to block 214.

In block 214, the system 100 takes corrective action based on the reason(s) for the failed test(s). For example, the system 100 may have determined that a test failed because of a problematic testing sequence. So, the system 100 can execute a modified version of the testing phase 120 that avoids the problematic testing sequence to prevent another failure of the testing phase 120.

As another example, the system 100 may have determined that a test failed due to a problem with the test itself, rather than a defect in the underlying source code being tested. The system 100 may also determine that the failed test is skippable (e.g., if the failed test is present in a predefined list of skippable tests generated by the system 100 or a user). Based on determining that the failed test is skippable, the system 100 can execute a modified version of the testing phase 120 that skips the test to prevent another failure of the testing phase 120. Alternatively, the system 100 may simply re-designate the failed test or the test phase 120 as having passed, so that the continuous integration pipeline 112 can continue onto its next phase (e.g., merging of the source code into a mainline code-base). This may expedite development time and reduce resource consumption.

As still another example, the system 100 may have determined that a test failed based on a hardware or software characteristic of the worker node 124a. So, the system 100 can modify the hardware or software characteristic of the worker node 124a to prevent another failure of the testing phase 120.

The above steps are intended to be illustrative, and other examples can include more steps, fewer steps, different steps, or a different order of the steps shown in FIG. 2. Likewise, while FIG. 1 depicts a specific arrangement of components, other examples can include more components, fewer components, different components, or a different arrangement of the components shown in FIG. 1. And any component or combination of components depicted in FIG. 1 can be used to implement the troubleshooting process(es) described herein.

Figure 3:
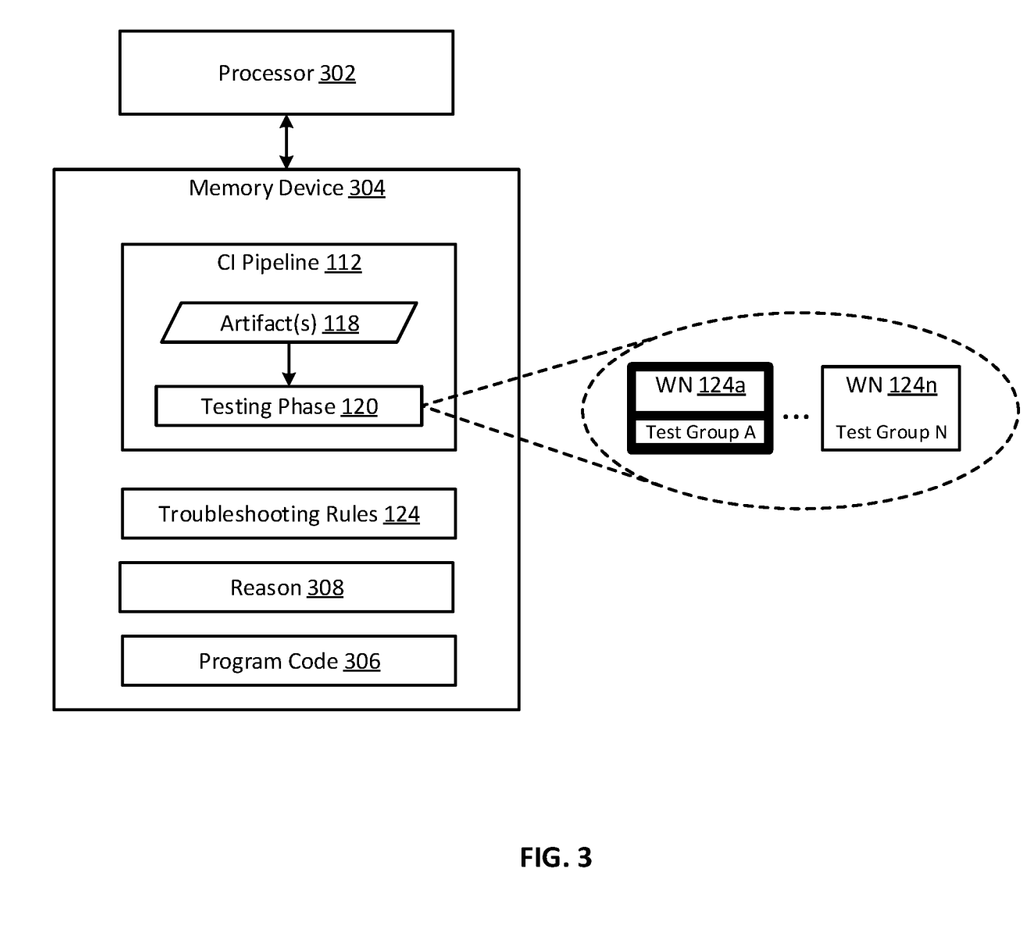
FIG. 3 is a block diagram of another example of a system for troubleshooting test failures that occurred during a testing phase of a continuous integration pipeline according to some aspects of the present disclosure.

FIG. 3 is a block diagram of another example of a system 300 for troubleshooting test failures that occurred during a testing phase 120 of a continuous integration pipeline 112 according to some aspects. The system 300 includes a processor 302 communicatively coupled with a memory device 304.

The processor 302 can include one processor or multiple processors. Non-limiting examples of the processor 302 include a Field-Programmable Gate Array (FPGA), an application-specific integrated circuit (ASIC), a microprocessor, etc. The processor 302 can execute program code 306 stored in the memory device 304 to perform operations. In some examples, the program code 306 can include processor-specific instructions generated by a compiler or an interpreter from code written in any suitable computer-programming language, such as C, C++, C#, etc.

The memory device 304 can include one memory device or multiple memory devices. The memory device 304 can be non-volatile and may include any type of memory device that retains stored information when powered off. Non-limiting examples of the memory device 304 include electrically erasable and programmable read-only memory (EEPROM), flash memory, or any other type of non-volatile memory. At least some of the memory device includes a non-transitory computer-readable medium from which the processor 302 can read program code 306. A non-transitory computer-readable medium can include electronic, optical, magnetic, or other storage devices capable of providing the processor 302 with the program code 306 or other program code. Non-limiting examples of a non-transitory computer-readable medium include magnetic disk(s), memory chip(s), ROM, random-access memory (RAM), an ASIC, a configured processor, optical storage, or any other medium from which a computer processor can read the program code 306.

In some examples, the processor 302 can detect that an artifact 118 failed a testing phase 120 of a continuous integration pipeline 112. The testing phase 120 can involve a plurality of worker nodes 124a-n each executing a respective group of tests (e.g., Test Group A and Test Group N) on the artifact 118. Based on detecting that the artifact 118 failed the testing phase, the processor 302 can determine that a particular worker node among the plurality of worker nodes 124a-n executed at least one test that failed. For example, the particular worker node can be worker node 124a, as highlighted in FIG. 3. The processor 302 can then determine the respective group of tests that was executed by the particular worker node. For example, processor can determine that the worker node 124a executed Test Group A, as highlighted in FIG. 3. Finally, the processor 302 can re-execute the respective group of tests on the artifact 118 in accordance with troubleshooting rules 124 to determine a reason 308 that the at least one test failed.

Figure 4:
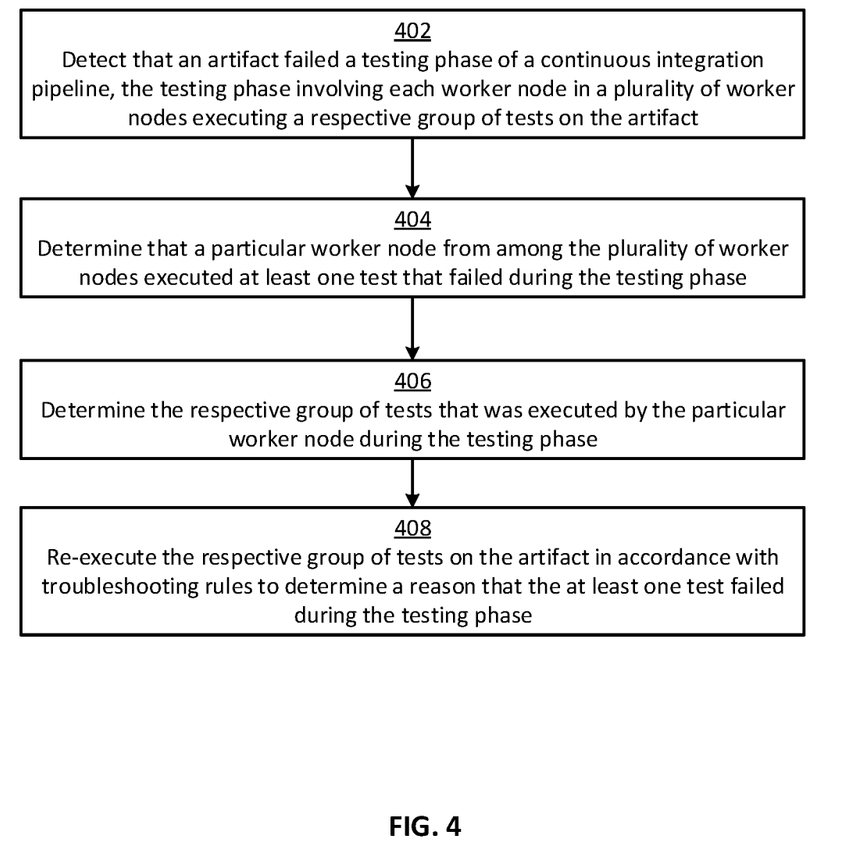
FIG. 4 is a flow chart of another example of a troubleshooting process according to some aspects of the present disclosure.

In some examples, the processor 302 can perform one or more of the steps shown in FIG. 4. In other examples, the processor 302 can implement more steps, fewer steps, different steps, or a different order of the steps depicted in FIG. 4. The steps of FIG. 4 are described below with reference to components discussed above.

In block 402, the processor 302 detects that an artifact 118 failed a testing phase 120 of a continuous integration pipeline 112. The testing phase 120 can involve each worker node in a plurality of worker nodes 124a-n executing a respective group of tests on the artifact 118.

In block 404, the processor 302 determines that a particular worker node among the plurality of worker nodes 124a-n executed at least one test that failed.

In block 406, the processor 302 determines the respective group of tests that was executed by the particular worker node.

In block 408, the processor 302 re-executes the respective group of tests on the artifact 118 in accordance with troubleshooting rules 124 to determine a reason 308 that the at least one test failed.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, various examples described herein can be combined together to yield further examples.

The invention claimed is:

1. A system comprising:
a processor; and
a memory device storing program code that is executable by the processor for causing the processor to perform operations including:
   detecting that an artifact failed a testing phase of a continuous integration pipeline, the testing phase involving each worker node in a plurality of worker nodes executing a respective group of tests on the artifact; and
   based on detecting that the artifact failed the testing phase:
      determining that a particular worker node from among the plurality of worker nodes executed at least one test that failed during the testing phase, by comparing (i) an identifier of the at least one test that failed to (ii) identifiers of the respective group of tests executed by the particular worker node during the testing phase;
      determining the respective group of tests that was executed by the particular worker node during the testing phase; and
      re-executing the respective group of tests on the artifact in accordance with troubleshooting rules to determine a reason that the at least one test failed during the testing phase.

2. The system of claim 1, wherein the troubleshooting rules are defined by a plugin that is distinct from a continuous integration tool configured for executing the continuous integration pipeline, the plugin being downloadable and integrable with the continuous integration tool.

3. The system of claim 2, wherein the operations further comprise, prior to re-executing the respective group of tests on the artifact:
downloading the plugin from a repository comprising a plurality of plugins, the plurality of plugins having different sets of troubleshooting rules or being compatible with different types of continuous integration tools; and
integrating the plugin into the continuous integration tool for enabling the continuous integration tool to re-execute the respective group of tests on the artifact in accordance with the troubleshooting rules.

4. The system of claim 1, wherein the operations are defined by a plugin that is distinct from a continuous integration tool configured for executing the continuous integration pipeline, the plugin being downloadable and integrable with the continuous integration tool.

5. The system of claim 1, wherein the troubleshooting rules involve executing the respective group of tests in a plurality of different orders to determine a testing sequence that is responsible for causing the at least one test to fail.

6. The system of claim 5, wherein the operations further include:
   determining that the at least one test failed because of the testing sequence; and
   based on determining that the at least one test failed because of the testing sequence, executing a modified version of the testing phase on the artifact in which the respective group of tests are executed in an order that is different from the testing sequence to avoid another failure of the at least one test.

7. The system of claim 1, wherein the troubleshooting rules involve executing the respective group of tests on a plurality of commits associated with the artifact to identify a specific commit that is responsible for causing the at least one test to fail.

8. The system of claim 1, wherein the operations further include transmitting a notification to a client device reporting the reason that the at least one test failed to a developer.

9. The system of claim 1, wherein the operations further include:
   determining that the at least one test is skippable; and
   based on determining that the at least one test is skippable, executing a modified version of the testing phase on the artifact in which the at least one test is skipped to avoid another failure of the at least one test.

10. The system of claim 1, wherein the operations further include determining that the particular worker node executed the at least one test that failed by:
    determining the identifier of the at least one test that failed by accessing a list of failed tests associated with the testing phase, the list of failed tests being an aggregation of tests that failed during the testing phase from the plurality of worker nodes, wherein the list of failed tests includes the identifier of the at least one test that failed; and
    determining the identifiers of the respective group of tests by accessing a log file for the worker node, the log file being distinct from the list of failed tests, wherein the log file includes the identifiers of the respective group of tests executed by the particular worker node during the testing phase.

11. A computer-implemented method comprising:
    detecting that an artifact failed a testing phase of a continuous integration pipeline, the testing phase involving each worker node in a plurality of worker nodes executing a respective group of tests on the artifact; and
    based on detecting that the artifact failed the testing phase:
       determining that a particular worker node from among the plurality of worker nodes executed at least one test that failed during the testing phase, by comparing (i) an identifier of the at least one test that failed to (ii) identifiers of the respective group of tests executed by the particular worker node during the testing phase;
       determining the respective group of tests that was executed by the particular worker node during the testing phase; and
       re-executing the respective group of tests on the artifact in accordance with troubleshooting rules to determine a reason that the at least one test failed during the testing phase.

12. The method of claim 11, wherein the troubleshooting rules are defined by a plugin that is distinct from a continuous integration tool executing the continuous integration pipeline, the plugin being downloadable and integrable with the continuous integration tool.

13. The method of claim 12, further comprising, prior to re-executing the respective group of tests on the artifact:
    downloading the plugin from a repository comprising a plurality of plugins, the plurality of plugins having different sets of troubleshooting rules or being compatible with different types of continuous integration tools; and
    integrating the plugin into the continuous integration tool for enabling the continuous integration tool to re-execute the respective group of tests on the artifact in accordance with the troubleshooting rules.

14. The method of claim 11, wherein the troubleshooting rules involve executing the respective group of tests in a plurality of different orders to determine a testing sequence that is responsible for causing the at least one test to fail.

15. The method of claim 14, further comprising:
    determining that the at least one test failed because of the testing sequence; and
    based on determining that the at least one test failed because of the testing sequence, executing a modified version of the testing phase on the artifact in which the respective group of tests are executed in an order that is different from the testing sequence to avoid another failure of the at least one test.

16. The method of claim 11, wherein the troubleshooting rules involve executing the respective group of tests on a plurality of commits associated with the artifact to identify a specific commit that is responsible for causing the at least one test to fail.

17. The method of claim 11, further comprising:
    determining that the at least one test is skippable; and
    based on determining that the at least one test is skippable, executing a modified version of the testing phase on the artifact in which the at least one test is skipped to avoid another failure of the at least one test.

18. The method of claim 11, further comprising reporting the reason that the at least one test failed to a developer.

19. The method of claim 11, further comprising determining that the particular worker node executed the at least one test that failed by:
    determining the identifier of the at least one test that failed by accessing a list of failed tests associated with the testing phase, the list of failed tests being an aggregation of tests that failed during the testing phase from the plurality of worker nodes, wherein the list of failed tests includes the identifier of the at least one test that failed; and
    determining the identifiers of the respective group of tests by accessing a log file for the worker node, the log file being distinct from the list of failed tests, wherein the log file includes the identifiers associated with of the respective group of tests executed by the particular worker node during the testing phase.

20. A non-transitory computer-readable medium comprising program code that is executable by a processor for causing the processor to perform operations including:
    detecting that an artifact failed a testing phase of a continuous integration pipeline, the testing phase involving each worker node in a plurality of worker nodes executing a respective group of tests on the artifact; and
    based on detecting that the artifact failed the testing phase:

determining that a particular worker node from among the plurality of worker nodes executed at least one test that failed during the testing phase, by comparing (i) an identifier of the at least one test that failed to (ii) identifiers of the respective group of tests executed by the particular worker node during the testing phase;

determining the respective group of tests that was executed by the particular worker node during the testing phase; and re-executing the respective group of tests on the artifact in accordance with troubleshooting rules to determine a reason that the at least one test failed during the testing phase.

\* \* \* \* \*